United States Patent [19]

Parker

[11] Patent Number: 5,150,575
[45] Date of Patent: Sep. 29, 1992

[54] HYDRAULIC BRAKE BOOSTER

[75] Inventor: Donald L. Parker, Middletown, Ohio

[73] Assignee: General Motors Corporation, Detroit, Mich.

[21] Appl. No.: 734,006

[22] Filed: Jul. 22, 1991

[51] Int. Cl.$^5$ .......................... B60T 13/00; F15B 9/10
[52] U.S. Cl. ..................... 60/547.1; 60/581; 60/591; 60/593; 91/376 R
[58] Field of Search ............ 60/547.1, 548, 553, 60/581, 591, 593; 91/369.1, 376 R, 370, 373

[56] References Cited

U.S. PATENT DOCUMENTS

| | | | |
|---|---|---|---|
| 3,099,500 | 3/1960 | Anderson | 303/49 |
| 3,318,333 | 1/1965 | McCollum et al. | 137/625.69 |
| 3,786,636 | 1/1974 | Kobashi | 60/548 |
| 4,379,423 | 4/1983 | Leineweber et al. | 91/373 |
| 4,548,037 | 10/1985 | Farr | 60/552 |
| 4,566,275 | 1/1986 | Farr | 91/376 R |
| 4,656,923 | 4/1987 | Tsuyuki et al. | 60/547.1 |
| 4,741,161 | 5/1988 | Belart et al. | 60/547.1 |
| 4,754,604 | 7/1988 | Flory | 60/547.1 |
| 4,773,223 | 9/1988 | Mizusawa et al. | 91/376 R |
| 4,850,655 | 7/1989 | Takata et al. | 60/547.1 |

FOREIGN PATENT DOCUMENTS

| | | | |
|---|---|---|---|
| 0038699A1 | 4/1981 | European Pat. Off. | 13/14 |
| 3439271A1 | 10/1984 | Fed. Rep. of Germany | 13/14 |
| 2142398A | 6/1984 | United Kingdom | 13/14 |

*Primary Examiner*—Edward K. Look
*Assistant Examiner*—Hoang Nguyen
*Attorney, Agent, or Firm*—Ernest E. Helms

[57] ABSTRACT

A hydraulic booster for a vehicle brake master cylinder having a power piston with only one large diameter sliding seal which is exposed to a high hydraulic pressure. This provides a brake booster having lower hysteresis.

1 Claim, 1 Drawing Sheet

HYDRAULIC BRAKE BOOSTER

FIELD OF THE INVENTION

The field of the present invention is that of hydraulic boosters for vehicle brake master cylinders.

DISCLOSURE STATEMENT

It is known in the art to provide hydraulically actuated powered boosters for vehicle braking systems As more anti-lock braking (ABS) systems are utilized the hydraulic pressure of the hydraulic pump utilized in the system has constantly increased. The increased pressure provides new challenges in the maintenance of seal life and the minimization of hysteris. One example of a hydraulic brake booster which meets the above challenges is described in Flory commonly assigned U.S. Pat. No. 4,754,604. Another hydraulic booster which meets the above noted challenges and provides an alternative to Flory is shown and described in Reuter commonly assigned U.S. Pat. No. 533,140 filed Jun. 4, 1990. The present invention provides a hydraulic booster which provides an alternative to the above noted disclosures.

DETAILED DESCRIPTION OF THE DRAWINGS

Figure 1:
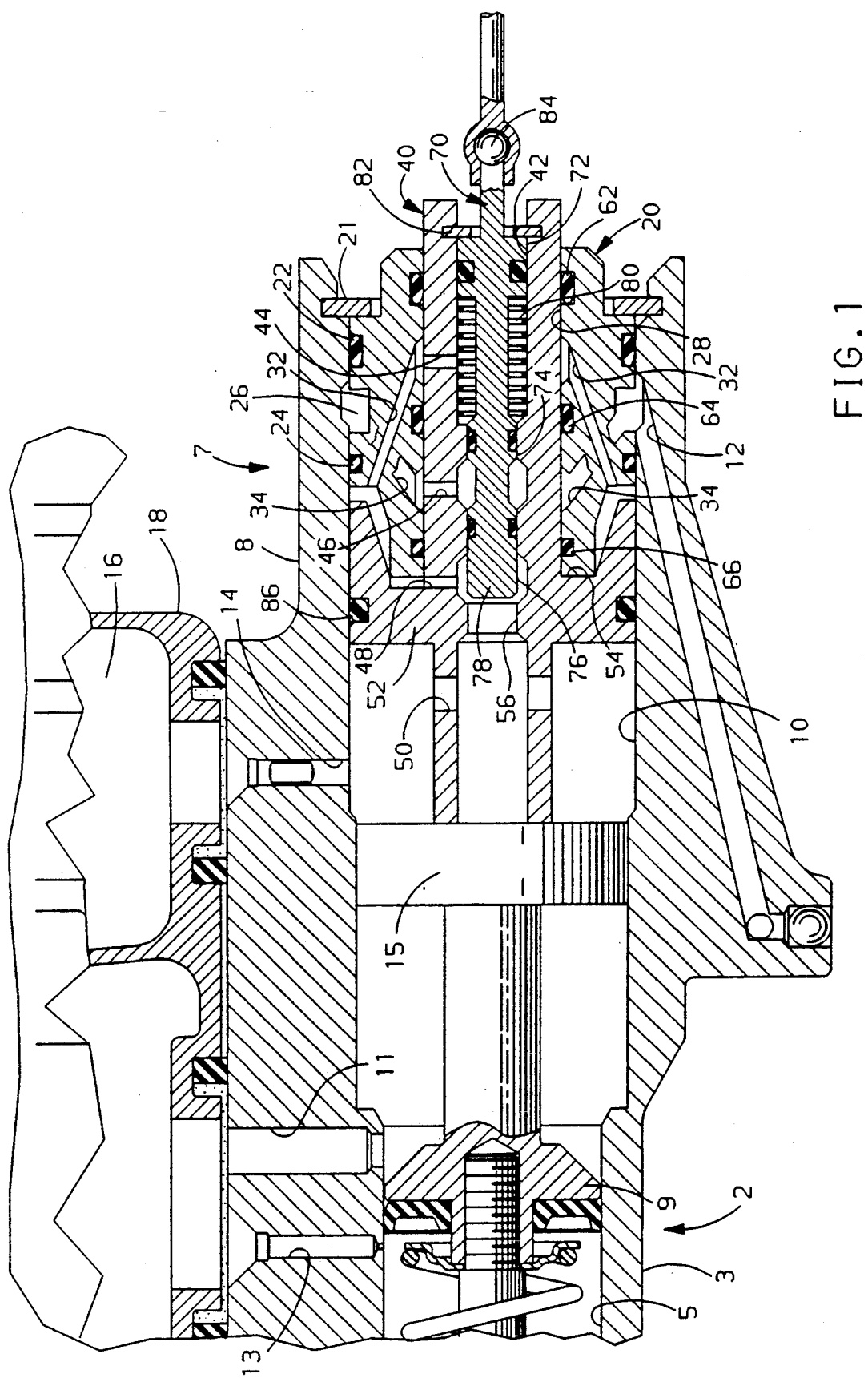
FIG. 1 is a sectional view of a preferred embodiment of the present invention.

FIG. 1 illustrates a low hysteresis brake booster 7 according to the present invention integrated with a master cylinder 2 of an automotive vehicle. The present invention can be utilized with single piston master cylinders or as more common dual chamber master cylinders. The master cylinder 2 has a frame 3 integral with a frame 8 of the brake booster 7 and sealably and slidably mounted within a bore 5 of the master cylinder is a piston of the rearward chamber.

The booster 7 has a multidiametered longitudinal bore 10 parallel and axially aligned with the bore 5 of the master cylinder. A second intersecting passage 12 of the booster bore provides an inlet for a source of pressurized hydraulic fluid from either a direct line with a hydraulic pump (not shown) or off of a line serviced by a hydraulic pump but pressurized by an accumulator. Axially spaced from the second intersecting passage 12 is a first intersecting passage 14 which is fluidly exposed with a sump 16. The sump 16 is typically provided by dual chamber fluid reservoir 18 which jointly feeds an inlet for the pressurized fluid source (not shown) and a compensating port 11 and a fluid bypass 13 for the master cylinder 2.

The master cylinder piston 9 has a rearward extension 15 which is slidably mounted within the bore 10.

Fixably and sealably mounted within the longitudinal bore 10 of the booster frame is a sleeve 20. The sleeve 20 is held against a ring clip 21 on a rearward end of the longitudinal bore 10 opposite the master cylinder piston 9. The sleeve 20 is sealed along its periphery at two locations by first and second O-rings 22,24 which are stationary and which form between them an annular sealed first pressure chamber 26. The sleeve 20 also has an interior bore 28 generally parallel with the longitudinal bore 10. The sleeve 20 has a first intersecting passage 32 with its interior bore 28 which connects a portion of the interior bore 28 on the end of the interior bore 28 generally opposite the master cylinder piston 9 with a portion of the periphery of the sleeve 20 which is more adjacent with the master cylinder piston 9.

The sleeve 20 also has a second intersecting passage 34 with the interior bore 28 which intersects the sleeve 20 interior bore at a location generally towards the master cylinder piston more adjacent than the intersection of the first passage 32. The second intersecting passage 34 also fluidly connects the interior bore 28 of the sleeve 20 with the first sealed annular chamber 26.

Slidably mounted within the interior bore 28 of the sleeve 20 and contacting with the master cylinder piston 9 is a power piston 40. The power piston 40 has a general cross-shape with an interior bore 42 with an travel axis generally parallel to the interior bore of the retainer.

The power piston 40 has a T-section 52 sealed along its outer parameter with means of sealing provided by an O-ring 86 along its outer perimeter with the longitudinal bore 10 of the frame. The longitudinal bore 42 of the power piston 40 has intersecting first 44, second 46, third 48 and fourth 50 generally radial passages. The first radial passage 44 is generally aligned with the intersection of the first retainer intersecting passage 32 when the power piston is at a rest position contacting along its rearward face 54 of the T-section 52 with a forward face of the sleeve 20.

The second axial passage 46 of the power piston is generally aligned with the second intersecting passage 34 of the sleeve 20 when the power piston is in the shown rest position. A third radial passage 48 of the power piston allows fluid communication from a portion of the outer periphery of the sleeve 20 exposed to the first intersecting passage 32 with the interior passage of the power piston when the power piston is at a rest position. The power piston has a fourth 50 general radial passage allowing fluid communication with the interior bore 42 of the power piston with the sump 16. Between the second and third radial passages of the power piston is an metering orifice 56 generally at the T-section of the power piston.

The power piston 40 has means of providing sealing with the interior bore 28 of the sleeve 20 along a rearward end of the sleeve 20 opposite the master cylinder piston 9 provided by O-ring 62. A second O-ring 64 provides means of sealing of the power piston 40 with the interior bore 28 of the sleeve 20 and is juxtaposed between the two intersecting passages 32,34 of the retainer A third means of sealing with the interior bore of the retainer is provided by another O-ring 66 which is at an end of the retainer towards the master cylinder piston 9.

Slidably mounted within the interior bore 42 of the power piston is a spool valve 70 having sealed first 72, second 74 and third 76 landings. The first landing of the spool valve is rearward of the first general radial passage 44 of the power piston. The second sealed landing 74 is located between the first 44 and second 46 radial passages of the power piston and in the rest position prevents fluid communication between the same. The third sealed landing 76 of the spool valve is located between the second 46 and third 48 general radial passages of the power piston.

The spool valve 70 also has a head 78 which can sealably mate with the orifice 56 of the power piston. A spring 80 contacting the first landing 72 biases the spool valve 70 against a stop means along its rear provided by a clip 82. An end 84 of the spool valve extending outside of the power piston is operatively associated with a brake pedal (not shown) controlled by the vehicle operator.

In operation to actuate the brakes from the rest position as shown in FIG. 1 the operator will move the brake pedal causing the spool valve 70 to move towards the brake master cylinder 2. The above movement will allow pressurized hydraulic fluid in the intersecting passage 12 to flow to the second intersecting passage 34 via the first pressure chamber 26. The second intersecting passage 34 is already exposed to the interior of the power piston via the second radial passage 46 pressurized fluid then passes behind the second sealed landing 74 thereby exiting the first passage 44 of the power piston and then out of the interior bore 28 of the sleeve into the first intersecting passage 32 pressurized fluid then feeds into the space behind the T-section 52 T-portion of the power piston. Prior to the admittance of fluid past the second sealed landing 74, the head 78 portion of the spool valve seals off the power piston orifice 56 and pressure builds up behind the T-section of the power piston 52. The power piston 40 is then displaced towards the master cylinder piston 9. Since most of the sealing with the power piston 40 is accomplished by stationary small diameter O-rings 62,64,66 therefore the hysteresis is essentially greatly reduced. Modulation of brake apply occurs by releasing of pressure of the brake pedal and allowing some of the fluid behind the power piston to escape through the orifice 56 and into return to the sump.

Another major advantage of the present invention is that there is only one dynamic seal 86 along the T-section 52 of the power piston.

The reaction ratio is the area of the power piston at the diameter of the seal 86 versus the diameter of the power piston at the seal 66. It is also apparent to those skilled in the art that number of radial passages 48, 46 and 44 may be increased to provide better balance.

I claim:

1. A low hysteresis hydraulic brake booster for a vehicle master cylinder which includes a longitudinal bore with a sealed piston mounted therein, the booster comprising:

frame means with a longitudinal bore being generally aligned and exposed to the bore of the master cylinder, and the frame having a first intersecting passage fluidly connected with a sump, the first intersecting passage being generally at an end of the frame longitudinal bore adjacent to the master cylinder, and the frame having a second intersecting passage with the frame longitudinal bore spaced generally opposite from the first intersecting passage for influx of pressurized fluid;

a sleeve located at an end of the frame longitudinal bore opposite the master cylinder piston, the sleeve being fixably mounted within the frame longitudinal bore, the sleeve being sealed with the frame longitudinal bore at two places forming with the frame longitudinal bore a first seal annular chamber, the sleeve having an interior bore generally parallel with the frame longitudinal bore, the sleeve interior bore having a first intersecting passage fluidly connecting a portion of the sleeve interior bore generally opposite the master cylinder piston with an outer periphery of the sleeve at a portion of the sleeve more adjacent to said master cylinder piston than the first annular sealed chamber, and the sleeve having a second passage intersecting with the sleeve interior bore, the second intersecting passage fluidly connecting the sleeve interior bore with the first annular sealed chamber at a portion of the sleeve interior bore more adjacent to the master cylinder piston than the location of the intersection of the first interior retainer passage with the sleeve interior bore;

a power piston contacting the master cylinder piston and the sleeve with a portion slidably mounted within the interior bore of the sleeve, the power piston being generally in the shape of a cross with a T-section and with a bore generally parallel with the sleeve interior bore, the T-section of the power piston having means of sealing with the longitudinal bore of the frame means, and the power piston having first, second, third and fourth radial passages intersecting with the interior bore of the power piston, the first radial passage when the power piston T-section is contacting the sleeve being generally aligned with the first intersecting passage of the sleeve, the second radical passage being generally aligned with the second intersecting passage of the sleeve and the third intersecting passage being generally adjacent an end of the sleeve most adjacent to the master cylinder piston, and a fourth radial passage intersecting the interior bore of the power piston with the longitudinal bore of the frame and exposed to the sump and being more adjacent to the master cylinder piston than the T-section of the power piston, and the power piston having an orifice generally parallel with the power piston interior bore axially juxtaposed between the third and fourth radial passages of the power piston, and the power piston having three means of sealing with the interior bore of the sleeve the first means of sealing being at an end of the sleeve interior bore generally opposite the master cylinder piston, a second means of sealing being located between intersections of the first and second intersecting passages of the sleeve with the sleeve bore, and a third means of sealing generally at an end of the sleeve most adjacent to the master cylinder piston juxtaposed when the power piston is contacting the sleeve between the second and third radial passages of the power piston;

and a spool valve operatively associated with an operator controlled brake panel of the vehicle having a first landing sealing off the interior of the power piston along and generally opposite the master cylinder piston, a second landing with means of sealing between the second and third radial bores of the power piston, and a third landing with means of sealing with the interior bore of the power piston between the second and third radial passages of the power piston and a head of the spool valve for sealing the orifice of the power piston;

a spring biasing the spool valve to a position away from the master cylinder mounted within the power piston whereby movement of the spool valve towards the master cylinder allows pressurized fluid to flow into the second sleeve intersecting passage through the second radial bore of the power piston around the second landing of the spool valve through the first radial bore of the power piston into the first intersecting passage of the sleeve and to force the power piston forward as the head of the spool valve closes off the orifice preventing the fluid from the side of the T-section of the power piston generally opposite the master cylinder piston from escaping through the third radial passage of the power piston through the orifice and then out the fourth radial passage to the sump.

* * * * *